United States Patent

Kobayashi et al.

[11] Patent Number: 6,151,205
[45] Date of Patent: Nov. 21, 2000

[54] SOLID ELECTROLYTIC CAPACITOR AND METHOD FOR MAKING THE SAME

[75] Inventors: Atsushi Kobayashi; Kenji Araki; Takashi Fukaumi, all of Tokyo, Japan

[73] Assignee: NEC Corporation, Tokyo, Japan

[21] Appl. No.: 09/149,660

[22] Filed: Sep. 9, 1998

[30] Foreign Application Priority Data

Sep. 10, 1997 [JP] Japan ................................. 9-245389

[51] Int. Cl.⁷ ........................... H01G 9/00; H01G 9/02
[52] U.S. Cl. .................... 361/523; 361/525; 29/25.03
[58] Field of Search ................... 29/25.03; 361/525, 361/523, 516; 252/62.2

[56] References Cited

U.S. PATENT DOCUMENTS

| | | | |
|---|---|---|---|
| 4,910,645 | 3/1990 | Jonas et al. | 361/525 |
| 5,130,886 | 7/1992 | Kishimoto et al. | 361/525 |
| 5,454,147 | 10/1995 | Kabayashi et al. | 29/25.03 |
| 5,567,209 | 10/1996 | Kobayashi et al. | 29/25.03 |
| 5,694,287 | 12/1997 | Nishiyama et al. | 361/525 |
| 5,752,986 | 5/1998 | Nishiyama et al. | 29/25.03 |
| 5,754,394 | 5/1998 | Evans | 361/516 |
| 5,812,367 | 9/1998 | Kudoh | 361/523 |

FOREIGN PATENT DOCUMENTS

| | | |
|---|---|---|
| 2-15611 | 1/1990 | Japan . |
| 4-239712 | 8/1992 | Japan . |
| 6-132167 | 5/1994 | Japan . |
| 10-32145 | 2/1998 | Japan . |
| 11-67602 | 3/1999 | Japan . |

*Primary Examiner*—Dean A. Reichard
*Assistant Examiner*—Anthony Dinkins
*Attorney, Agent, or Firm*—Sughrue, Mion, Zinn, Macpeak & Seas, PLLC

[57] ABSTRACT

A solid electrolytic capacitor using a conducting polymer to be formed by chemical oxidative polymerization as a solid electrolyte, the capacitor having: a capacitor element which includes a conducting polymer layer with a thickness of 0.02 $\mu$m or greater at its central part. A method for making the solid electrolytic capacitor, having the steps of: providing at least two kinds of solutions with different oxidizing-agent concentrations; and adjusting the thickness of a conducting polymer layer at central part of a capacitor element to be 0.02 $\mu$m or greater by using first a solution with a lowest oxidizing-agent concentration of the solutions and subsequently a solution with a next lowest oxidizing-agent concentration of the solutions.

6 Claims, 2 Drawing Sheets

1 ANODE WIRE
11 CAPACITOR ELEMENT
7 CONDUCTIVE ADHESIVE
10 EPOXY RESIN
9 CATHODE LEAD FRAME
8 ANODE LEAD FRAME
10 EPOXY RESIN

A
3 TANTALUM-OXIDE FILM
2 SINTERED PELLET
4 CONDUCTING POLYMER LAYER
5 CARBON PASTE LAYER
6 SILVER PASTE LAYER
CONDUCTING POLYMER AT CENTRAL PART
CONDUCTING POLYMER NEAR OUTER SURFACE
OUTER SURFACE
10 EPOXY RESIN

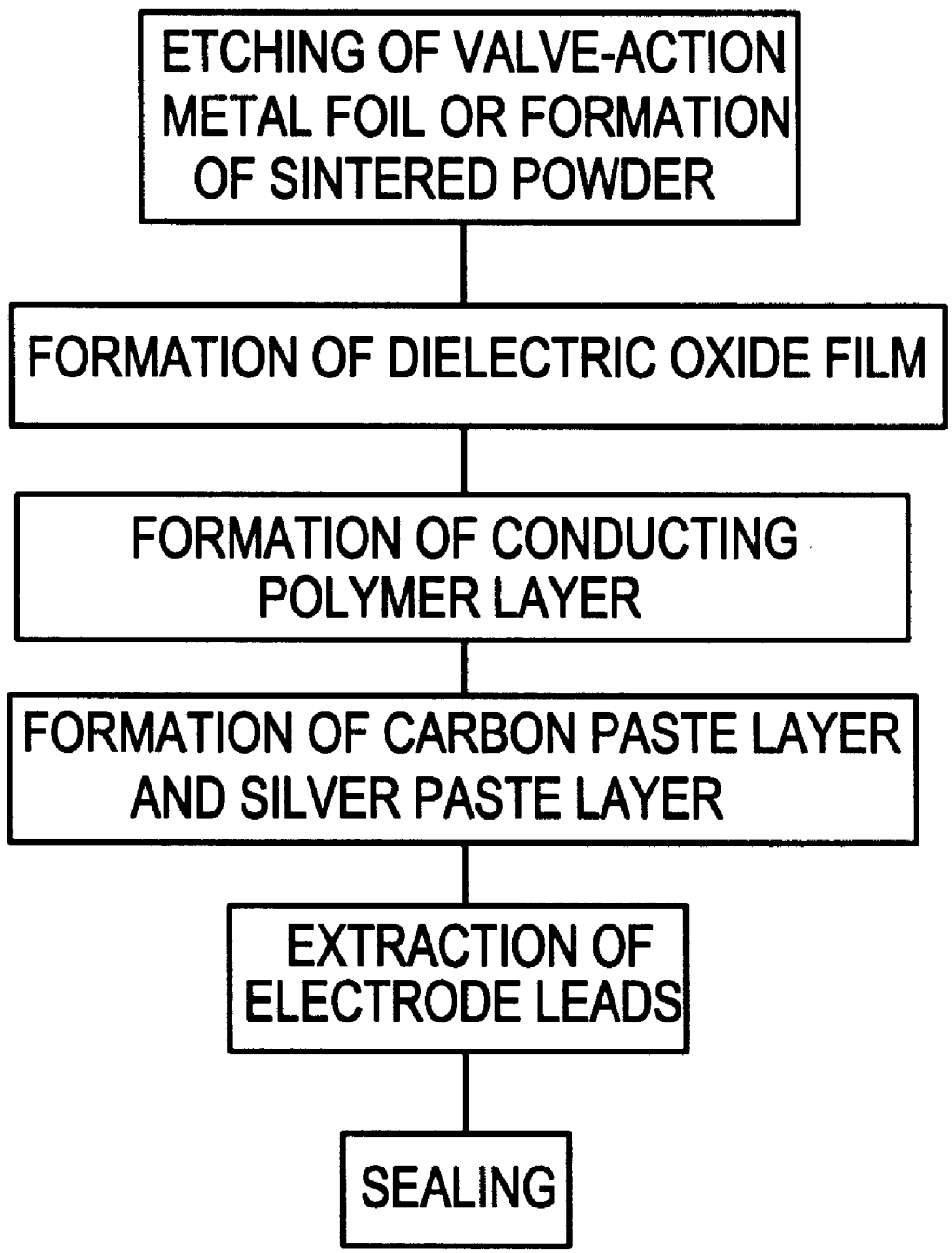

SOLID ELECTROLYTIC CAPACITOR AND METHOD FOR MAKING THE SAME

FIELD OF THE INVENTION

This invention relates to a solid electrolytic capacitor using a conducting polymer as a solid electrolyte and relates to a method for making the solid electrolytic capacitor.

BACKGROUND OF THE INVENTION

A solid electrolytic capacitor is composed of a porous material of valve-action metal such as tantalum, niobium and aluminum to be used as a first electrode (anode), an oxide film formed thereon to be used as a dielectric, and a solid electrolyte formed thereon to be used as part of a second electrode (cathode) The solid electrolyte serves to electrically connect between the entire surface inside the porous material and an electrode lead. Therefore, it needs desirably to have such a high conductivity that can reduce the resistance of the capacitor itself. On the other hand, the solid electrolyte also needs to serve to recover an electrical short-circuit due to a defect in the dielectric film. Thus, metals having a high conductivity but not having the dielectric recovering function cannot be used as the solid electrolyte. Manganese dioxide, TCNQ complex etc., which can change into an insulator by heating due to the short-circuit, have been used. In particular, manganese dioxide, which has thermal stability at 240° C. or higher, has been generally used because the capacitor is subject to a temperature of 240 to 260° C. when it is mounted on a printed board.

Thus, a material used as a solid electrolyte for solid electrolytic capacitor needs to satisfy the three requirements, i.e., a high conductivity, a dielectric recovering function and a thermal stability at 240° C. or higher.

Manganese dioxide, which has been conventionally used as the solid electrolyte, has sufficient properties as to the dielectric recovering function and thermal stability. However, its conductivity (about 0.1 S/cm) is not always sufficient for a solid electrolyte for solid electrolytic capacitor. Therefore, in recent years, a solid electrolytic capacitor using a conducting polymer, such as polypyrrole, polythiophene and polyaniline, to satisfy the three requirements of the solid electrolyte as a solid electrolyte has been developed. A solid electrolytic capacitor using polypyrrole is already commercially available.

In general, there are four problems in solid electrolytic capacitors using a conducting polymer. First, the conducting polymer has to be surely formed on the entire surface inside the porous material. Second, in a high-temperature atmosphere to which the solid electrolytic capacitor is exposed, the conductivity of the conducting polymer may not be reduced. Third, the conducting polymer has to be formed on the oxide film, with such a film thickness that can stand a stress generated in the expansion/contraction of covering resin. Fourth, to reduce the manufacturing cost of the capacitor, the conducting polymer layer needs to be simply formed.

To solve the above problems, a method of preparing a solid electrolyte by polymerizing a thiophene derivative with iron (II) compound has been proposed (Japanese patent application laid-open No. 2-15611 (1990) and U.S. Pat. No. 4,910,645). This method is suitable for solving the second problem because the polymer of the thiophene derivative has a thermal stability higher than the polymer of a pyrrole derivative.

Also, the inventors of this invention have proposed a method of conducting the chemical oxidative polymerization by using a dopant with a large molecular size, and an oxidizing agent, such as a copper (II) compound, a silver compound etc. (Japanese patent application No. 8-185831 (1996)).

However, in the method disclosed in Japanese patent application laid-open No. 2-15611 (1990) and U.S. Pat. No. 4,910,645, there is a problem that the conductivity is reduced due to the occurrence of de-doping in a severe high temperature atmosphere at 125° C. or 150° C. The reason is as follows: In forming the conducting polymer layer by using a high-concentration oxidizing agent, it is formed near the outer surface of the capacitor element and thereby it becomes difficult for a solution used to form the conducting polymer to permeate into the central part of the capacitor element. Therefore, the thickness of the conducting polymer layer at the central part of the capacitor element is extremely reduced. As a result, due to the heating in the heat test, the thinned inner conducting polymer layer must be changed into an insulator.

SUMMARY OF THE INVENTION

Accordingly, it is an object of the invention to provide a solid electrolytic capacitor with a suppressed thermal deterioration.

It is a further object of the invention to provide a solid electrolytic capacitor that can have a reduced impedance, thereby reducing its size and weight.

It is a further object of the invention to provide a solid electrolytic capacitor that can have a high thermal stability, enhancing the reliability.

It is a further object of the invention to provide a method for making such a solid electrolytic capacitor.

According to the invention, a solid electrolytic capacitor using a conducting polymer to be formed by chemical oxidative polymerization as a solid electrolyte, comprises:

a capacitor element which includes a conducting polymer layer with a thickness of 0.02 $\mu$m or greater at its central part.

According to another aspect of the invention, a method for making a solid electrolytic capacitor using a conducting polymer to be formed by chemical oxidative polymerization as a solid electrolyte, comprises the steps of:

providing at least two kinds of solutions with different oxidizing-agent concentrations; and adjusting the thickness of a conducting polymer layer at central part of a capacitor element to be 0.02 $\mu$m or greater by using first a solution with a lowest oxidizing-agent concentration of the solutions and subsequently a solution with a next lowest oxidizing-agent concentration of the solutions.

An oxidizing agent to be used in this invention is not specifically limited. Namely, any agents with an oxidizing function, e.g., iron (II) ion, copper (II) ion, silver ion, can be used. However, considering productivity in the manufacturing process of capacitor, iron (II) ion and copper (II) ion are desirable because they can give a high yield in the polymerization reaction of conducting polymer.

Also, a dopant to be used in this invention is not specifically limited. However, organic sulfonic acid ions, e.g., aromatic sulfonic acids, aromatic polysulfonic acids, organic sulfonic acids with hydroxy group, organic sulfonic acids with carboxyl hydroxyl group, alicyclic sulfonic acids, benzoquinone sulfonic acids, are especially effective against the reducing of the conductivity in conducting polymer layer because they have a large molecular size and are hard to de-dope in a high-temperature atmosphere.

Also, a chemical oxidative polymerization method used to form the conducting polymer of this invention is not specifically limited. Namely, it can be, for example, a method of introducing a mixed solution of a monomer for conducting polymer, an oxidizing agent and a dopant to be cooled lower than a reaction-initiating temperature into a porous material of valve-action metal with oxide film formed thereon, and then reacting the solution by keeping it in an atmosphere higher than the reaction-initiating temperature; a method of introducing a mixed solution of an oxidizing agent and a dopant as it is or with a proper solvent into the porous material of valve-action metal, and then contacting the solution with the monomer for conducting polymer as it is, or in a solution or gaseous state; and a method of first introducing the monomer for conducting polymer into the porous material of valve-action metal, and then contacting the monomer with the mixed solution of an oxidizing agent and a dopant.

Also, a solvent for at least two kinds of solutions with different oxidizing-agent concentrations to be used in this invention is not specifically limited, if it can dissolve the monomer, oxidizing agent and dopant. However, lower alcohol, water etc. are preferable because they are easy to handle and are inexpensive.

Especially, provided according to the invention is a solid electrolytic capacitor using a conducting polymer to be formed by chemical oxidative polymerization as a solid electrolyte, the solid electrolytic capacitor having a capacitor element which includes a conducting polymer layer with a thickness of 0.02 $\mu$m or greater at its central part, and satisfying that the difference between the thickness of the conducting polymer layer at central part of the capacitor element and a thickness of the conducting polymer layer near the outer surface of the capacitor element is 0.08 $\mu$m or less. Due to such a composition, the internal conducting polymer layer can be prevented from being an insulator due to the heating of the heat test. Namely, even when a heat test at 125 to 150° C. is conducted, the deterioration of conductivity in the conducting polymer layer can be significantly suppressed.

BRIEF DESCRIPTION OF THE DRAWINGS

The invention will be explained in more detail in conjunction with the appended drawings, wherein:

FIG. 2 is a flow chart showing a schematic process of a method for making a solid electrolytic capacitor according to the invention.

DESCRIPTION OF THE PREFERRED EMBODIMENTS

Figure 1A:
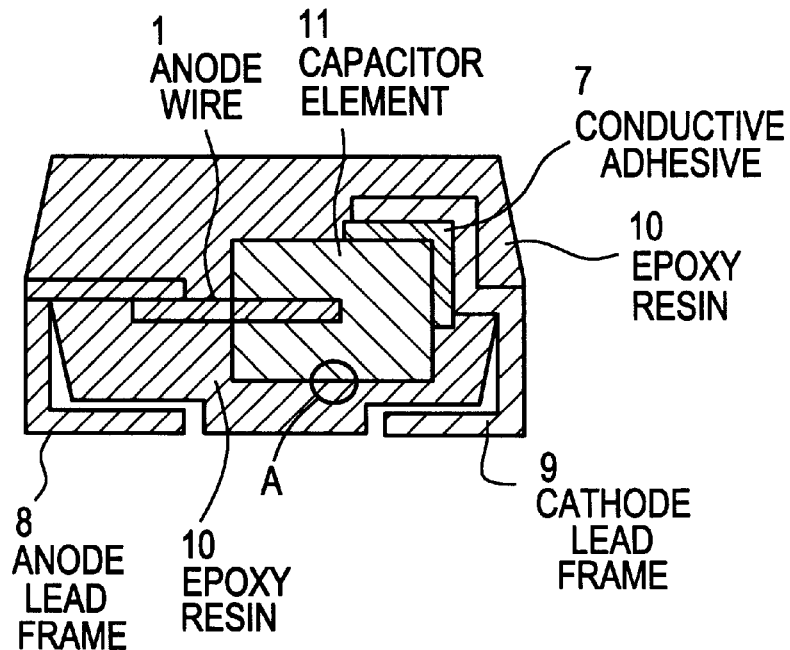
FIG. 1A is a cross sectional view showing a solid electrolytic capacitor according to the invention.
Figure 1B:
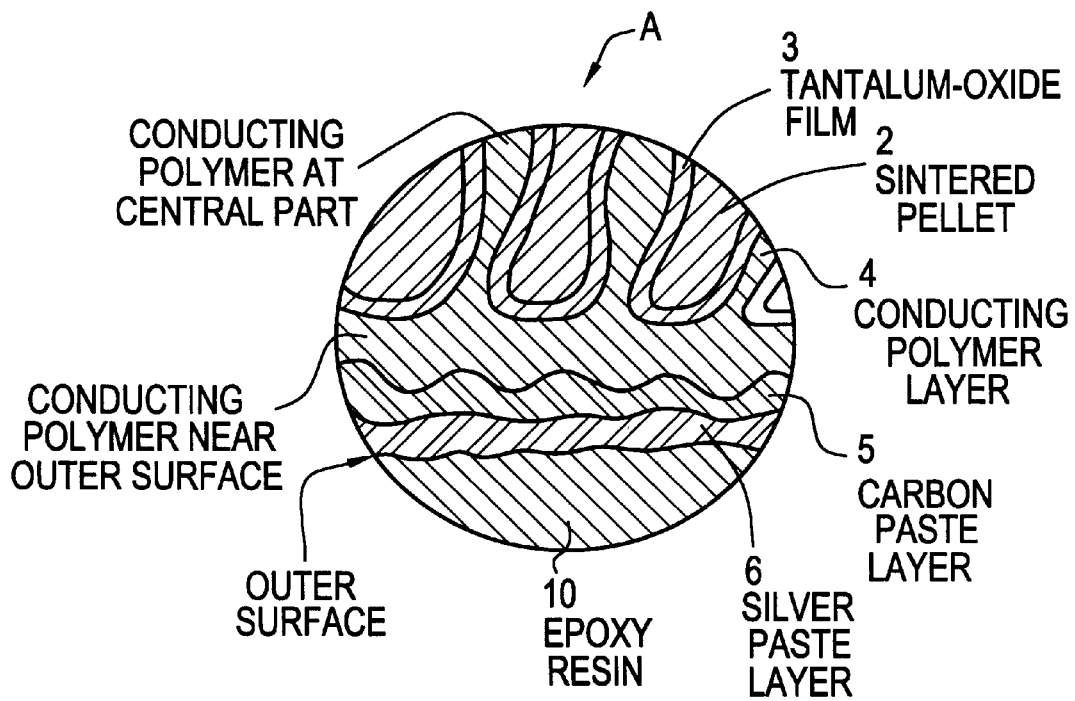
FIG. 1B is an enlargement of the area marked by the circle A in FIG. 1A.

FIG. 2 is a flow chart showing an example of a method for making a solid electrolytic capacitor. When the valve-action metal is of an aluminum foil, the aluminum foil is etched to form a number of pores on its surface. When the valve-action metal is of tantalum or niobium power, the power is pressed into sintered powder. Then, the anodic oxidation of the valve-action metal is conducted to form oxide film as a dielectric layer. Thereafter, the conducting polymer layer as solid electrolyte is formed thereon. Then, by coating it with carbon paste and silver paste, baking it, connecting external anode lead and cathode lead, and sealing it, a product can be obtained.

A solid electrolytic capacitor and a method for making a solid electrolytic capacitor in preferred embodiments according to the invention will be exemplified below. However, this invention is not limited to the embodiments.

EXAMPLE 1

Rectangular-solid-shaped tantalum sintered pellets 2 (porosity of about 60%) of 1 mm long, 1 mm wide and 1 mm high are anodic-oxidized in 0.05% nitric acid to form tantalum oxide film 3 as a dielectric layer. The capacitance of the sintered pellets 2 in sulfuric acid measures 12.2 $\mu$F (120 Hz).

Then, the sintered pellets 2 are soaked in a 100 g methanol solution of 3.5% pyrrole/19% iron (II) dodecylbenzenesulfonate to be cooled at −70° C. Then, by keeping it at the room temperature for 30 min., cleaning it with methanol for 15 min., and drying it in a 85° C. thermostatic bath for 30 min., a polypyrrole layer is formed. These steps are repeated five times.

Then, the sintered pellets 2 are soaked in a 100 g methanol solution of 7% pyrrole/38% iron (II) dodecylbenzenesulfonate to be cooled at −70° C. Then, by keeping it at the room temperature for 30 min., cleaning it with methanol for 15 min., and drying it in a 85° C. thermostatic bath for 30 min., a polypyrrole layer is formed. By repeating these steps five times, a conducting polymer layer 4 of dodecylbenzensulfonic-acid-doped polypyrrole is formed.

Then, by forming a carbon paste layer 5 and a silver paste layer 6, a capacitor element is obtained. Then, by welding an anode lead frame 8 to an anode wire 1 of the capacitor element, connecting a cathode lead frame 9 through conductive adhesive to the capacitor element, and sealing it with epoxy resin 10, a chip capacitor is obtained.

EXAMPLE 2

Similarly to Example 1, the sintered pellets 2 with the oxide film 3 formed thereon are first soaked in a 100 g methanol solution of 6.5% pyrrole/19% iron (II) toluenesulfonate to be cooled at −70° C. Then, by keeping it at the room temperature for 30 min., cleaning it with methanol for 15 min., and vacuum-drying it at 85° C. for 30 min., a polypyrrole layer is formed. These steps are repeated five times.

Then, the sintered pellets 2 are soaked in a 100 g ethanol solution of 13% pyrrole/38% iron (II) toluenesulfonate to be cooled at −70° C. Then, by keeping it at the room temperature for 30 min., cleaning it with methanol for 15 min., and vacuum-drying it at 85° C. for 30 min., a polypyrrole layer is formed. By repeating these steps five times, a conducting polymer layer 4 of toluenesulfonic-acid-doped polypyrrole is formed.

Then, by conducting the other process in the same way as Example 1, a chip capacitor is obtained.

EXAMPLE 3

Similarly to Example 1, the sintered pellets 2 with the oxide film 3 formed thereon are soaked in a 100 g methanol solution of 19% iron (II) dodecylbenzenesulfonate to be cooled at −5° C. Then, by keeping it at the room temperature for 30 min., soaking it in a pyrrole solution to be cooled at −5° C., further keeping it at the room temperature for 30 min., cleaning it with methanol for 15 min., and vacuum-drying it at 85° C. for 30 min., a polypyrrole layer is formed. These steps are repeated five times.

Then, the sintered pellets 2 are soaked in a 100 g methanol solution of 38% iron (II) dodecylbenzenesulfonate to be cooled at −5° C. Then, by keeping it at the room temperature for 30 min., soaking it in a pyrrole solution to be cooled at −5° C., further keeping it at the room temperature for 30 min., cleaning it with methanol for 15 min., and vacuum-drying it at 85° C. for 30 min., a polypyrrole layer is formed. By repeating these steps five times, a conducting polymer layer 4 of dodecylbenzenesulfonic-acid-doped polypyrrole is formed.

Then, by conducting the other process in the same way as Example 1, a chip capacitor is obtained.

EXAMPLE 4

Similarly to Example 1, the sintered pellets 2 with the oxide film 3 formed thereon are soaked in a 100 g ethanol solution of 5.5% (3,4-ethylenedioxythiophene)/19% iron (II) dodecylbenzenesulfonate to be cooled at −5° C. Then, by keeping it at the room temperature for 90 min., cleaning it with methanol for 15 min., and vacuum-drying it at 150° C. for 30 min., a poly(3,4-ethylenedioxythiophene) layer is formed. These steps are repeated five times.

Then, the sintered pellets 2 are soaked in a 100 g methanol solution of 11% (3,4-ethylenedioxythiophene)/38% iron (II) dodecylbenzenesulfonate to be cooled at −5° C. Then, by keeping it at the room temperature for 90 min., cleaning it with methanol for 15 min., and vacuum-drying it at 150° C. for 30 min., a poly(3,4-ethylenedioxythiophene) layer is formed. By repeating these steps five times, a conducting polymer layer 4 of dodecylbenzenesulfonic-acid-doped poly(3,4-ethylenedioxythiophene) is formed.

Then, by conducting the other process in the same way as Example 1, a chip capacitor is obtained.

EXAMPLE 5

Similarly to Example 1, the sintered pellets 2 with the oxide film 3 formed thereon are soaked in a 100 g methanol solution of 9% (3,4-ethylenedioxythiophene)/19% iron (II) toluenesulfonate to be cooled at −5° C. Then, by keeping it at the room temperature for 90 min., cleaning it with methanol for 15 min., and vacuum-drying it at 150° C. for 30 min., a poly(3,4-ethylenedioxythiophene) layer is formed. These steps are repeated five times.

Then, the sintered pellets 2 are soaked in a 100 g methanol solution of 18% (3,4-ethylenedioxythiophene)/38% iron (II) toluenesulfonate to be cooled at −5° C. Then, by keeping it at the room temperature for 90 min., cleaning it with methanol for 15 min., and vacuum-drying it at 150° C. for 30 min., a poly(3,4-ethylenedioxythiophene) layer is formed. By repeating these steps five times, a conducting polymer layer 4 of toluenesulfonic-acid-doped poly(3,4-ethylenedioxythiophene) is formed.

Then, by conducting the other process in the same way as Example 1, a chip capacitor is obtained.

EXAMPLE 6

Similarly to Example 1, the sintered pellets 2 with the oxide film 3 formed thereon are soaked in a 100 g aqueous solution of 20% iron (II) toluenesulfonate. Then, by keeping it at the room temperature for 60 min., soaking it in a (3,4-ethylenedioxythiophene) solution, keeping it at the room temperature for 90 min., cleaning it with methanol for 15 min., and vacuum-drying it at 150° C. for 30 min., a poly(3,4-ethylenedioxythiophene) layer is formed. These steps are repeated five times.

Then, the sintered pellets 2 are soaked in a 100 g ethanol solution of 38% iron (II) toluenesulfonate. Then, by keeping it at the room temperature for 60 min., soaking it in a (3,4-ethylenedioxythiophene) solution, keeping it at the room temperature for 90 min., cleaning it with methanol for 15 min., and vacuum-drying it at 150 ° C. for 30 min., a poly(3,4-ethylenedioxythiophene) layer is formed. By repeating these steps five times, a conducting polymer layer 4 of toluenesulfonic-acid-doped poly(3,4-ethylenedioxythiophene) is formed.

Then, by conducting the other process in the same way as Example 1, a chip capacitor is obtained.

COMPARATIVE EXAMPLE 1

Similarly to Example 1, the sintered pellets 2 are soaked in a 100 g methanol solution of 7% pyrrole/38% iron (II) dodecylbenzenesulfonate to be cooled at −70° C. Then, by keeping it at the room temperature for 30 min., cleaning it with methanol for 15 min., and drying it at 150° C. for 30 min., a polypyrrole layer is formed. By repeating these steps ten times, a conducting polymer layer 4 of dodecylbenzenesulfonic-acid-doped polypyrrole is formed.

Then, by conducting the other process in the same way as Example 1, a chip capacitor is obtained.

COMPARATIVE EXAMPLE 2

Similarly to Example 6, the sintered pellets 2 are soaked in a 100 g methanol solution of 11% (3,4-ethylenedioxythiophene)/38% iron (II) dodecylbenzenesulfonate to be cooled at −5° C. Then, by keeping it at the room temperature for 90 min., cleaning it with methanol for 15 min., and drying it at 150° C. for 30 min., a conducting polymer layer 4 of benzenedisulfonic-acid-doped poly(3,4-ethylenedioxythiophene) is formed.

Then, by conducting the other process in the same way as Example 1, a chip capacitor is obtained.

EVALUATION RESULTS

Table 1 shows conducting polymer film thicknesses inside and outside of the capacitor element measured by an electron microscope, and equivalent series resistance (ESR) at 100 kHz before and after the heat test at 125° C., for the capacitors obtained in Examples 1 to 6 and Comparative Examples 1 and 2. As a result, it is proved that the capacitors of the invention have an excellent thermal stability, compared with that in Comparative Examples.

TABLE 1

| | film thickness ($\mu$m) of conducting plymer at central part/near outer surface of capacitor element | ESR before test [m$\Omega$] | ESR after test (1000 hours passed) [m$\Omega$] |
|---|---|---|---|
| ESR Before And After The Heat Test At 125° C. | | | |
| Example 1 | 0.10/0.13 | 125 | 126 |
| Example 2 | 0.12/0.15 | 125 | 126 |
| Example 3 | 0.14/0.16 | 125 | 126 |
| Example 4 | 0.12/0.15 | 125 | 126 |
| Example 5 | 0.10/0.14 | 125 | 126 |
| Example 6 | 0.11/0.15 | 125 | 126 |
| Comp. Ex. 1 | 0.01/0.15 | 134 | 1,850 |
| Comp. Ex. 2 | 0.01/0.15 | 94 | 356 |

Although the invention has been described with respect to specific embodiments for complete and clear disclosure, the appended claims are not to be thus limited but are to be construed as embodying all modification and alternative constructions that occur to one skilled in the art which fairly fall within the basic teaching herein set forth.

What is claimed is:

1. A solid electrolytic capacitor using a conducting polymer to be formed by chemical oxidative polymerization as a solid electrolyte, comprising:

a capacitor element which includes a conducting polymer layer with a thickness of 0.02 μm or greater at a central part of said capacitor element.

2. A solid electrolytic capacitor, according to claim 1, wherein:

the difference between said thickness of said conducting polymer layer at the central part of said capacitor element and a thickness of said conducting polymer layer near an outer surface of said capacitor element is 0.08 μm or less.

3. A solid electrolytic capacitor, according to claim 1, wherein:

said conducting polymer is a polymer polymerized from at least one kind of monomer to be selected from the group consisting of pyrrole, thiophene, furan and these derivatives.

4. A method for making a solid electrolytic capacitor using a conducting polymer to be formed by chemical oxidative polymerization as a solid electrolyte, comprising the steps of:

providing at least two kinds of solutions with different oxidizing-agent concentrations; and adjusting the thickness of a conducting polymer layer at a central part of a capacitor element to be 0.02 μm or greater by using first a solution with a lowest oxidizing-agent concentration of said solutions and subsequently a solution with a next lowest oxidizing-agent concentration of said solutions.

5. A method for making a solid electrolytic capacitor, according to claim 4, wherein:

the difference between said thickness of said conducting polymer layer at the central part of said capacitor element and a thickness of said conducting polymer layer near an outer surface of said capacitor element is kept to be 0.08 μm or less by using first a solution with the lowest oxidizing-agent concentration of said solutions and subsequently a solution with the next lowest oxidizing-agent concentration of said solutions.

6. A method for making a solid electrolytic capacitor, according to claim 4, wherein:

said conducting polymer is a polymer polymerized from at least one kind of monomer to be selected from the group consisting of pyrrole, thiophene, furan and these derivatives.

* * * * *

UNITED STATES PATENT AND TRADEMARK OFFICE
CERTIFICATE OF CORRECTION

PATENT NO.   : 6,151,205
DATED        : November 21, 2000
INVENTOR(S)  : Atsushi Kobayashi, Kenji Araki, Takshi Fukami It is certified that error appears in the above-identified patent and that said Letters Patent is hereby corrected as shown below:

<u>Table 1 column 6,</u>
Lines 55-60
Example 2 delete "125 126" insert -- 136 134 --
Example 3 delete "125 126" insert -- 132 132 --
Example 4 delete "125 126" insert -- 95 95 --
Example 5 delete "125 126" insert -- 93 93 --
Example 6 delete "125 126" insert -- 88 87 --

Signed and Sealed this

Eleventh Day of September, 2001

*Attest:*

*Nicholas P. Godici*

NICHOLAS P. GODICI
*Attesting Officer*   *Acting Director of the United States Patent and Trademark Office*